United States Patent
Blais

(10) Patent No.: US 7,492,965 B2
(45) Date of Patent: *Feb. 17, 2009

(54) MULTIPLE MAP IMAGE PROJECTING AND FUSING

(75) Inventor: Marc Blais, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 833 days.

This patent is subject to a terminal disclaimer.

(21) Appl. No.: 11/014,705

(22) Filed: Dec. 20, 2004

(65) Prior Publication Data

US 2005/0267854 A1    Dec. 1, 2005

Related U.S. Application Data

(60) Provisional application No. 60/574,924, filed on May 28, 2004.

(51) Int. Cl.
*G06K 9/36* (2006.01)

(52) U.S. Cl. .................................. 382/284

(58) Field of Classification Search ............ 382/108, 382/174, 176, 190, 206, 285, 316; 701/1, 701/3–5, 8–9, 13–14, 207, 300–302; 345/423–429, 345/538, 552, 582, 586, 588, 211; 340/945, 340/951, 973
See application file for complete search history.

(56) References Cited

U.S. PATENT DOCUMENTS

| | | | |
|---|---|---|---|
| 4,876,651 A | 10/1989 | Dawson et al. | |
| 4,903,216 A | 2/1990 | Huss et al. | |
| 4,931,954 A | 6/1990 | Honda et al. | |
| 4,970,682 A | 11/1990 | Beckwith, Jr. et al. | |
| 5,041,992 A | 8/1991 | Cunningham et al. | |
| 5,086,396 A | 2/1992 | Waruszewski, Jr. | |
| 5,179,638 A | 1/1993 | Dawson et al. | |
| 5,222,205 A | 6/1993 | Larson et al. | |
| 5,278,946 A | 1/1994 | Shimada et al. | |
| 5,319,744 A | 6/1994 | Kelly et al. | |
| 5,355,442 A | 10/1994 | Paglieroni et al. | |
| 5,428,744 A | 6/1995 | Webb et al. | |
| 5,506,947 A | 4/1996 | Taubin | |

(Continued)

FOREIGN PATENT DOCUMENTS

EP        0 337 338 B1    12/1996

(Continued)

OTHER PUBLICATIONS

*Three-Dimensional Intervisibility Algorithm*, IBM Technical Disclosure Bulletin, Jul. 1991, pp. 61-66.

(Continued)

*Primary Examiner*—Sherali Ishrat
(74) *Attorney, Agent, or Firm*—Miles & Stockbridge PC; James T. Carmichael

(57) ABSTRACT

A system and method for multiple map image projecting and fusing in an object oriented computer environment. The multiple map image projecting and fusing method may provide a flexible and efficient architecture for generating combined map images from one or more map data sources. One or more map image objects may be coupled to map data objects, map projection objects and other map image objects according to a contemplated use of the invention.

24 Claims, 11 Drawing Sheets

U.S. PATENT DOCUMENTS

| | | | |
|---|---|---|---|
| 5,526,260 A | 6/1996 | Kodet et al. | |
| 5,574,915 A | 11/1996 | Lemon et al. | |
| 5,630,035 A | 5/1997 | Gjullin et al. | |
| 5,631,640 A | 5/1997 | Deis et al. | |
| 5,673,376 A | 9/1997 | Ray et al. | |
| 5,767,857 A * | 6/1998 | Neely | 345/427 |
| 5,781,195 A | 7/1998 | Marvin | |
| 5,831,624 A | 11/1998 | Tarolli et al. | |
| 5,838,262 A | 11/1998 | Kershner | |
| 6,034,694 A | 3/2000 | Evans et al. | |
| 6,047,236 A | 4/2000 | Hancock et al. | |
| 6,057,861 A | 5/2000 | Lee et al. | |
| 6,097,397 A | 8/2000 | Lee | |
| 6,124,864 A | 9/2000 | Madden et al. | |
| 6,128,019 A | 10/2000 | Crocker, III et al. | |
| 6,169,550 B1 | 1/2001 | Jain | |
| 6,184,894 B1 | 2/2001 | Rosman et al. | |
| 6,191,791 B1 | 2/2001 | Dyer et al. | |
| 6,191,795 B1 | 2/2001 | Liepa | |
| 6,222,555 B1 | 4/2001 | Christofferson et al. | |
| 6,232,980 B1 | 5/2001 | Liepa | |
| 6,262,741 B1 | 7/2001 | Davies | |
| 6,288,721 B1 | 9/2001 | Donoghue et al. | |
| 6,304,268 B1 | 10/2001 | Iourcha et al. | |
| 6,308,132 B1 | 10/2001 | Wilson et al. | |
| 6,317,690 B1 | 11/2001 | Gia | |
| 6,320,592 B1 | 11/2001 | Evans et al. | |
| 6,346,948 B1 | 2/2002 | Evans et al. | |
| 6,401,038 B2 | 6/2002 | Gia | |
| 6,404,431 B1 | 6/2002 | Farmer | |
| 6,430,548 B1 | 8/2002 | Deis et al. | |
| 6,434,481 B2 | 8/2002 | Winter et al. | |
| 6,476,813 B1 | 11/2002 | Hansen | |
| 6,501,482 B1 | 12/2002 | Rosman et al. | |
| 6,529,821 B2 | 3/2003 | Tomasi et al. | |
| 6,559,853 B1 * | 5/2003 | Hashimoto et al. | 345/582 |
| 6,570,578 B1 | 5/2003 | Smirnov et al. | |
| 6,583,790 B1 | 6/2003 | Wolters | |
| 6,593,947 B1 | 7/2003 | Ashe et al. | |
| 6,600,489 B2 | 7/2003 | Cook | |
| 6,618,049 B1 | 9/2003 | Hansen | |
| 6,646,647 B1 | 11/2003 | Surgutchik et al. | |
| 6,661,424 B1 | 12/2003 | Alcorn et al. | |
| 6,677,957 B2 | 1/2004 | Grzeszczuk et al. | |
| 6,697,062 B2 | 2/2004 | Cabral et al. | |
| 6,707,452 B1 | 3/2004 | Veach | |
| 7,242,407 B2 * | 7/2007 | Blais | 345/582 |
| 2001/0020948 A1 | 9/2001 | Piazza et al. | |
| 2001/0024203 A1 | 9/2001 | Yamada et al. | |
| 2002/0033821 A1 | 3/2002 | Sfarti | |
| 2002/0158897 A1 | 10/2002 | Besaw et al. | |
| 2003/0034981 A1 | 2/2003 | Wada | |
| 2003/0191766 A1 | 10/2003 | Elin | |
| 2004/0007121 A1 | 1/2004 | Graves et al. | |
| 2004/0015512 A1 | 1/2004 | Ashe et al. | |
| 2004/0030492 A1 | 2/2004 | Fox et al. | |
| 2005/0267652 A1 | 12/2005 | Allstadt et al. | |
| 2005/0267855 A1 | 12/2005 | Blais | |

FOREIGN PATENT DOCUMENTS

| | | |
|---|---|---|
| WO | WO 95/19544 | 7/1995 |
| WO | WO 95/19545 | 7/1995 |
| WO | WO 95/19546 | 7/1995 |

OTHER PUBLICATIONS

*Terrain Exposure Factor*, IBM Technical Disclosure Bulletin, Jan. 1994, pp. 649-652.

Office Action dated Jun. 2, 2008 in U.S. Appl. No. 11/015,305.

Notice of Allowance dated May 29, 2007 for U.S. Appl. No. 11/062,693.

Notice of Allowance dated Mar. 6, 2007 for U.S. Appl. No. 10/957,621.

* cited by examiner

MULTIPLE MAP IMAGE PROJECTING AND FUSING

This application claims the benefit of U.S. Provisional Application No. 60/574,924, filed May 28, 2004, which is incorporated herein by reference.

The present invention relates generally to object oriented computer graphics and, more particularly, to object oriented software for digital maps.

Digital map images may be generated from a source of map data. It may be desirable to generate multiple map images from a single data source and for each image to have different characteristics depending on the contemplated use of the image. Further multiple map images may be generated from multiple map data sources and it may be desirable to combine or fuse the different images into a combined image. It may also be desirable to provide connectivity between map image objects and map data and map projection objects.

Conventional map image generation software may have associations between a map image and a map database. The associations may be limited in number and type. The associations may be coded into the software and may not be readily adapted or changed. Further, when creating a combined map image, conventional map image generation software may generate each image separately and then perform either a merge operation on the individual images to create a single image, or render each image separately, one atop the other.

A system and method of multiple map image projecting and fusing in accordance with the present invention may overcome the limitations of the conventional methods of generating map images.

Briefly, in an exemplary embodiment of the present invention, three objects are created, a map data object, a map image object, and a map projection object. The map data object provides members and methods to access a map data source. The map image object provides members and methods to generate map images based on map data and a map projection. The map projection object provides methods for projecting map data into a map image having a specified projection. The map image object may be connected with any map data source or any other map image object. The map data source may be a map database or another map data object.

In an exemplary embodiment of a method for multiple map image projecting and fusing in an object oriented computer system, in accordance with the present invention a map data object is created. Then, a map image object and a map projection object are created.

The map data object is connected to a map data source by invoking a map data connection method of the map data object and providing a map data source identifier. The map image object is connected to the map data object by invoking a map data selection method of the map image object and providing an identifier for the map data object. A second map image object is created and connected to the map data source, or connected to another map data source. The second map image object may be connected to the same map projection object as the first map image object. The second map image object may also be connected to the map image of the first map image object. Invoking a map image rendering method of the first map image object creates a map image. A combined map image is created by invoking the map rendering method of the second map image object, whereby the second image is projected and then fused into the map image of the first map image object.

The exemplary embodiment of the present invention described above provides for any combination of map images to be associated with map data objects or other map image objects and projected and fused with other map images. Further, the system and method of the present invention may provide a savings of processing time and memory during the generation of a combined map image.

BRIEF DESCRIPTION OF THE DRAWINGS

The present invention will be described with reference to the accompanying drawings, wherein.

DETAILED DESCRIPTION

Figure 1:
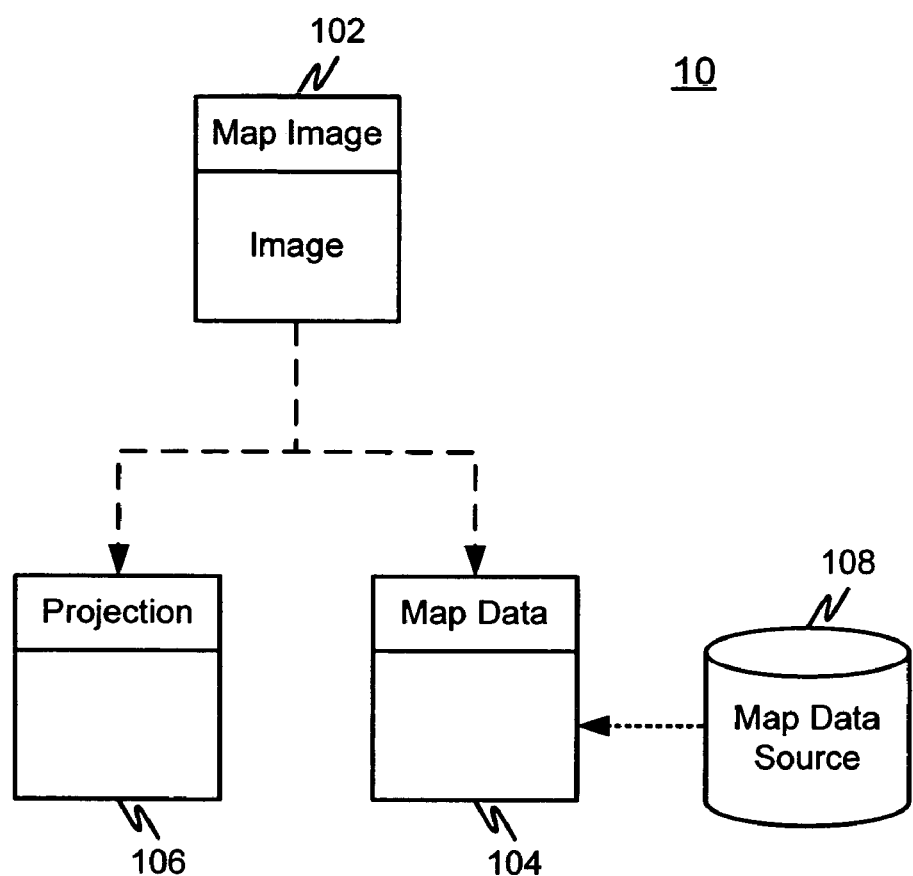
FIG. 1 is a block diagram of map object connectivity in accordance with the present invention.

In accordance with the present invention, a system and method of multiple map image projecting and fusing is provided. The system and method of multiple map image projecting and fusing may provide a flexible and efficient framework from which to develop digital map applications. The digital map applications may be used in a variety of platforms, such as, for example, mapping terminals, land vehicles, ships, fixed wing or rotary wing aircraft, unmanned aerial vehicles, command and control centers, spacecraft, and/or the like.

Further, the system and method of multiple map image projecting and fusing may be practiced in a client-server computer environment. The map image object, map data object, and map projection object may each be distributed onto different processors, or they may be co-located. The connections between the objects may be software connections within a processor, software connections across a distributed system, wired connections, wireless connections, or a combination of the above in a non-distributed or distributed environment.

The systems and methods of the present invention are illustrated below in terms of specific exemplary embodiments. However, it should be appreciated that the systems and methods of the present invention are not limited to the specific exemplary embodiments shown and this invention may be practiced in various configurations in accordance with a contemplated use of the invention.

Map images may be of different types, such as, for example, chart, sun shaded, elevation banded, and/or the like. The map images may be generated from map data of different types, such as, for example, digital terrain elevation data (DTED), controlled image base (CIB) map data, compressed arc digitized raster graphics (CADRG), and/or the like.

In an exemplary embodiment, the MapData class (the map data object base class) provides an API (Application Program Interface) for derived map database classes. The MapData class is abstract, meaning that it cannot be used by itself. It is a building block to be used when creating an implementation for a particular kind of map data.

Most of the MapData API is defined as pure virtual methods. These virtual methods must be implemented when creating a derived class for a particular kind of map data. The presence of the [virtual] label in the table below denotes a virtual method that has a default implementation in this class, [pure virtual] denotes a virtual method with no default implementation, and [protected] indicates that the method can only be accessed by derived classes. Table 1, below, contains an exemplary embodiment of the methods that may be found in the MapData API:

TABLE 1

Connect (specify) the location of a map database

| | |
|---|---|
| CanConnectToMapObject( ) | [pure virtual] |
| ConnectToMapObject( ) | [pure virtual] |
| CanConnectToMultipleDbPaths( ) | [pure virtual] |
| ConnectToDbPath( ) | [pure virtual] |
| Disconnect( ) | [pure virtual] |

Query the type of map data supported and the availability of data.

| | |
|---|---|
| GetMapTypeLongString( ) | [pure virtual] |
| GetMapTypeString( ) | [pure virtual] |

Query the available map scales and initialize to a particular map scale.

| | |
|---|---|
| GetNumberScales( ) | [pure virtual] |
| GetScaleIndex( ) | [pure virtual] |
| GetScaleString( ) | [pure virtual] |
| GetScaleStringLong( ) | [pure virtual] |
| GetScaleStringNumeric( ) | [pure virtual] |
| IsValidScale( ) | [pure virtual] |
| SetScale( ) | [pure virtual] |

Query the available feature data, and initialize features.

| | |
|---|---|
| FeaturesHaveColor( ) | [pure virtual] |
| GetFeatureActivation( ) | [pure virtual] |
| GetFeatureClass( ) | [pure virtual] |
| GetFeatureCode( ) | [pure virtual] |
| GetFeatureColor( ) | [pure virtual] |
| GetFeatureName( ) | [pure virtual] |
| GetTotalNumberFeatures( ) | [pure virtual] |
| IsValidFeatureCode( ) | [pure virtual] |
| IsValidFeatureName( ) | [pure virtual] |
| SetFeatureActivation( ) | [pure virtual] |
| SetFeatureColor( ) | [pure virtual] |

Query and initialize projections.

| | |
|---|---|
| CanSetProjection( ) | [pure virtual] |
| CloneProjection( ) | [pure virtual] |
| GetProjection( ) | [pure virtual] |
| HaveProjection( ) | [pure virtual] |
| MakeProjection( ) | [pure virtual] |

Initialize and request a data load, and query data availability.

| | |
|---|---|
| AbortLoad( ) | [pure virtual] |
| CanSetSizeCells( ) | [pure virtual] |
| CanQueryDataAvail( ) | [pure virtual] |
| ClearReadLock( ) | [virtual] |

TABLE 1-continued

| | |
|---|---|
| GetUpdateCount( ) | [inline] |
| HaveData( ) | [pure virtual] |
| Load( ) | |
| LoadData( ) | [protected, pure virtual] |
| SetReadLock( ) | [virtual] |
| SetSizeCells( ) | [pure virtual] |
| SetSizeDegrees( ) | [pure virtual] |

An exemplary implementation of the MapData class may be responsible for reading a particular type of map data from disk files and storing that data into memory. The format of the data storage may be left to the implementer of the derived class.

Derived classes must implement all pure virtual API methods. Other virtual methods must be implemented if the default behavior does not meet the needs of the derived class. Derived classes should initialize to some default state, such that a minimum number of method calls are required to accomplish loading data into memory.

In an exemplary embodiment, the minimal set of methods required to accomplish this may be:

ConnectToDbPath( . . . ) or ConnectToMapObject( . . . )
SetSizeDegrees( . . . ) or SetSizeCells( . . . )
SetScale( . . . )
Load( . . . )

In an exemplary embodiment, the responsibility of the MapImage class may be to provide an API for map image classes. The MapImage class may be abstract, or not, in which case the MapImage class may be used as a complete object. By itself, the MapImage class cannot create a map image because it is not associated with any particular kind of map data. However, a map image object may contain a map image by using associations that can be set up between map images. The MapImage class may be a building block to be used when creating an implementation for a particular kind of map data.

The MapImage API has some methods that are implemented within the class, and some API methods that are defined as virtual methods. The API methods implemented within this class have to do with the providing initialization and access to the image and establishing relationships between different MapImage objects.

The API methods that are defined as virtual are methods that need to be implemented when creating a derived class for a particular kind of map data.

Table 2, below, contains an exemplary embodiment of the MapImage class methods.

TABLE 2

Initialize the image.

Clear( )
GetBackgroundColor( )
GetBytesPerPixel( )
GetBytesPerPixel( )
GetClut( )
GetImagePointer( )
GetImageSize( )
GetImageType( )
GetSubImage( )
SetBackgroundColor( )
SetClut( )
SetImageMemory( )
SetImageSize( )
SetImageType( )

TABLE 2-continued

Establish associations with map data and other map images, and setup projection.

| | |
|---|---|
| GetMapData( ) | [virtual] |
| SetMapData( ) | [virtual] |
| GetProjection( ) | |
| CreateProjection( ) | |
| SetBaseImage( ) | |
| SetProjection( ) | |

Initialize image processing and generate images.

| | |
|---|---|
| CanDither( ) | [virtual] |
| GenerateImage( ) | [protected, virtual] |
| GetImageAttributes( ) | [virtual] |
| GetImageObject( ) | |
| GetUpdateCount( ) | [inline] |
| MakeImage( ) | |
| UseDitherMap( ) | [virtual] |

An exemplary implementation of the MapImage class is responsible for reading a particular type of map data from disk files and storing that data into memory. The format of the data storage is left to the implementer of the derived class.

Derived classes must implement all pure virtual API methods. Other virtual methods must be implemented if the default behavior does not meet the needs of the derived class. Derived classes should initialize to some default state, such that a minimum number of method calls are required to accomplish loading data into memory. The minimal set of method calls required to accomplish this may be:

SetImageType( . . . )
SetImageSize( . . . )
SetMapData( . . . )
MakeImage( . . . )

In an exemplary embodiment, it is the responsibility of the Projection class to provide an API for projection classes. The Projection class is abstract, meaning that it cannot be used by itself. It is a building block to be used when creating an implementation for a particular kind of projection.

The Projection API has some methods that are implemented within the class, and some API methods that are defined as virtual methods. The API methods implemented are methods that are the same regardless of the type of projection, or they use specific implementations of other methods.

The API methods that are defined as virtual are methods that need to be implemented when creating a derived class for a particular kind of projection.

The presence of the [virtual] label in the table below denotes a virtual method that has a default implementation in this class, [pure virtual] denotes a virtual method with no default implementation, and the [protected] label indicates that derived classes can only access the method. Table 3, below, lists the methods of an exemplary embodiment of the MapProjection class.

TABLE 3

Initialize and query the projection.

| | |
|---|---|
| CanSetDatum( ) | [pure virtual] |
| Compute( ) | [protected, pure virtual] |
| GetDatum( ) | |
| GetEllipsoid( ) | |
| GetOrigin( ) | |
| GetRangeScale( ) | |
| GetBounds( ) | [pure virtual] |
| GetReferencePosition( ) | |

TABLE 3-continued

| | |
|---|---|
| GetTypeString( ) | |
| FetchTypeString( ) | [protected, pure virtual] |
| SetDatum( ) | |
| SetDatum( ) | |
| SetNumericScale( ) | |
| SetOrigin( ) | |
| SetRangeScaleDegrees( ) | |
| SetRangeScaleMeters( ) | |
| SetReferencePosition( ) | |
| ValidLatLonDeg( ) | [inline] |

Perform conversions

| | |
|---|---|
| ArcsecsToMeters( ) | |
| ArcsecsToProjection( ) | [pure virtual] |
| ArcsecsToProjection( ) | [pure virtual] |
| ArcsecsWGS84ToProjection( ) | |
| ArcsecsWGS84ToProjection( ) | |
| DegreesLocalToWGS84( ) | |
| DegreesToMeters( ) | |
| DegreesToProjection( ) | [pure virtual] |
| DegreesToProjection( ) | [pure virtual] |
| DegreesWGS84ToLocal( ) | |
| DegreesWGS84ToProjection( ) | |
| DegreesWGS84ToProjection( ) | |
| MetersToArcsecs( ) | |
| MetersToDegrees( ) | |
| MetersToProjection( ) | |
| MetersToProjection( ) | |
| ProjectionToArcsecs( ) | [pure virtual] |
| ProjectionToArcsecs( ) | [pure virtual] |
| ProjectionToArcsecsWGS84( ) | |
| ProjectionToArcsecsWGS84( ) | |
| ProjectionToDegrees( ) | [pure virtual] |
| ProjectionToDegrees( ) | [pure virtual] |
| ProjectionToDegreesWGS84( ) | |
| ProjectionToDegreesWGS84( ) | |
| ProjectionToMeters( ) | |
| ProjectionToMeters( ) | |

An exemplary implementation of the Projection class is responsible for maintaining the conversion algorithms that the projection defines Derived classes must implement all pure virtual API methods. Derived classes should initialize to some default state such that a minimum number of method calls are required to use the projection. The minimal set of method calls required to accomplish this may be:

SetOrigin( . . . )

SetReferencePosition( . . . )

SetRangeScale( . . . )

FIG. 1 is a block diagram of map objects in accordance with the present invention. In particular, a multiple map image projecting and fusing system 10 comprises a map image object 102, a map data object 104, a map projection object 106, and a map data source 108. The map image object 102 is connected to the map data object 104 and the map projection object 106. The map data object 104 is connected to the map data source 108.

In operation, the map image object 102 and the map data object 104 are created. The map data object 104 is connected to the map data source 108. The map data object 104 is connected to the map image object 102. The map projection object 106 is connected to the map image object 102.

The map image object 102 requests map data from the map data object 104 and then generates a map image by projecting the map data using the map projection object 106.

Figure 2:
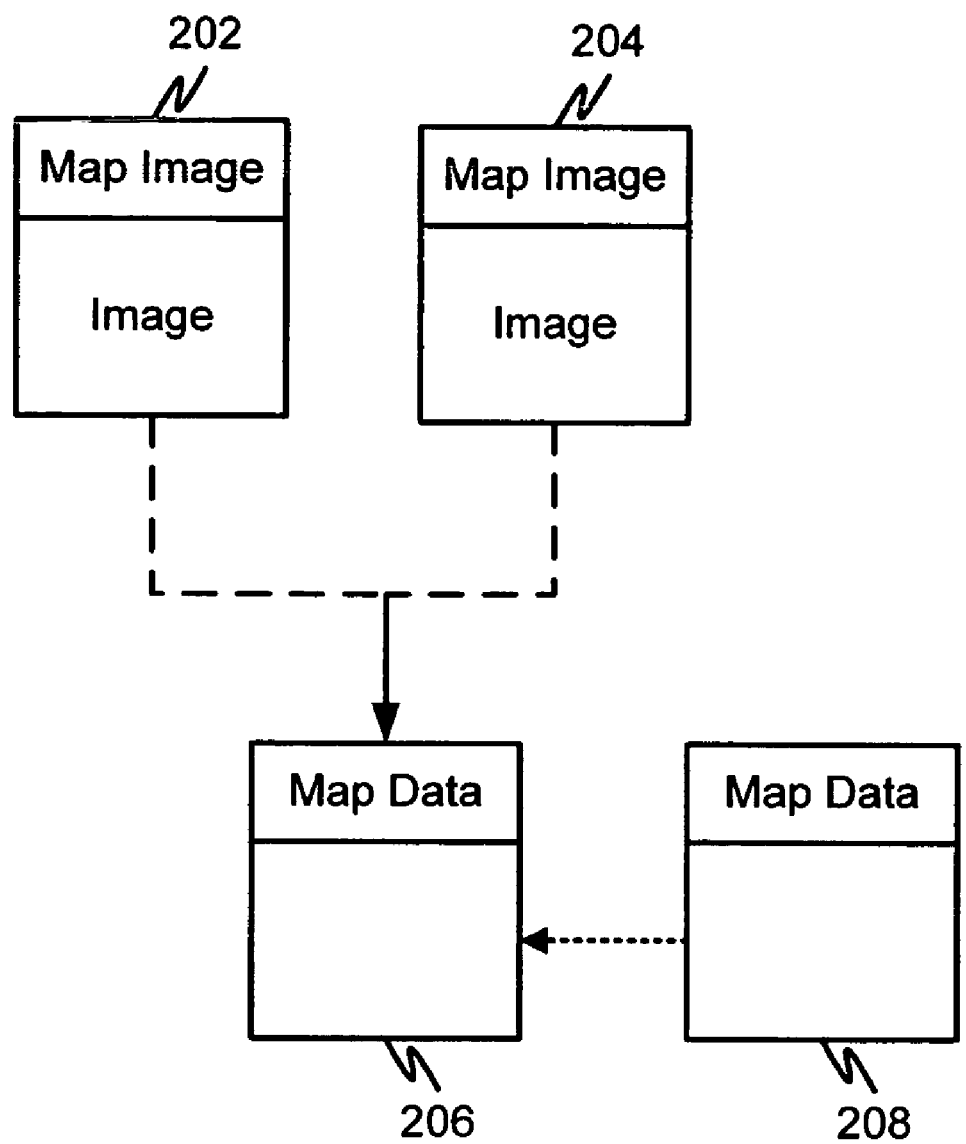
FIG. 2 is a block diagram of an exemplary embodiment of map object connectivity in accordance with the present invention.

FIG. 2 is a block diagram of an exemplary embodiment of map object connectivity in accordance with the present invention. In particular, a first map image object 202 and a second map image object 204 are connected to a single map data object 206. The map data object 206 is connected to a map data source 208.

In operation, the first map image object 202 may generate a first map image based on data received from the map data object 206. The second map image object 204 may generate a second map image that may have different characteristics from the first map image. The second map image is based on data received from the map data object 206. The map image objects (202 and 204) may use the same map projection object or may use different map projection objects. In creating a combined map image a map image of the second map image object 204 may be connected to a map image of the first map image object. When creating a combined map image it may be desirable for both map image objects to use the same map projection object in order to achieve an aligned combined image. However, different map projection objects may be used if a contemplated use of the invention may requires such a configuration.

The map image objects may be of different image type or of the same image type. Although the map image objects may be of the same image type, they may still differ in other characteristics, such as, for example, geographic coverage, image size, image format, scale, and/or any other configurable detail of the class from which the map image object is derived.

Further, while two map image objects are shown connected to a single map data object, it should be appreciated that any number of map image objects may be connected to a single map data object, or multiple map image objects may be connected to multiple map data objects.

Figure 3:
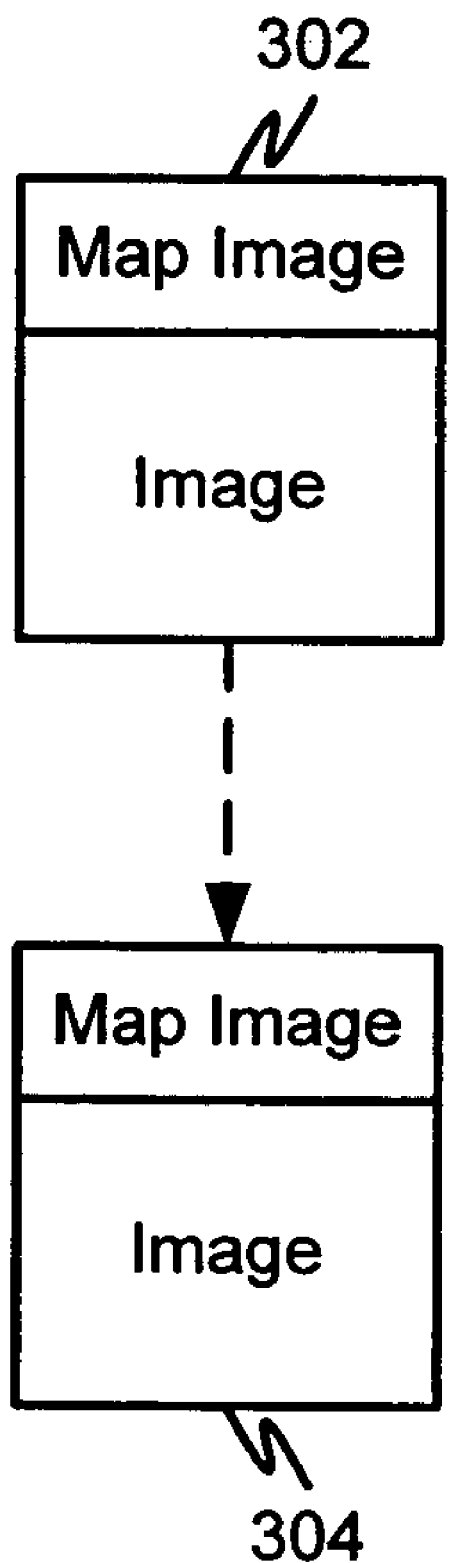
FIG. 3 is a block diagram of an exemplary embodiment of map object connectivity in accordance with the present invention.

FIG. 3 is a block diagram of an exemplary embodiment of map object connectivity in accordance with the present invention. In particular, a first map image object 302 is connected to a second map image object 304. In this configuration the first map image object 302 may generate a map image and store the map image in the memory space allocated to the map image of the second map image object 304. In addition, the map image objects may project and then fuse each map image to create a combined map image using the first map image object and the second map image object.

Figure 4:
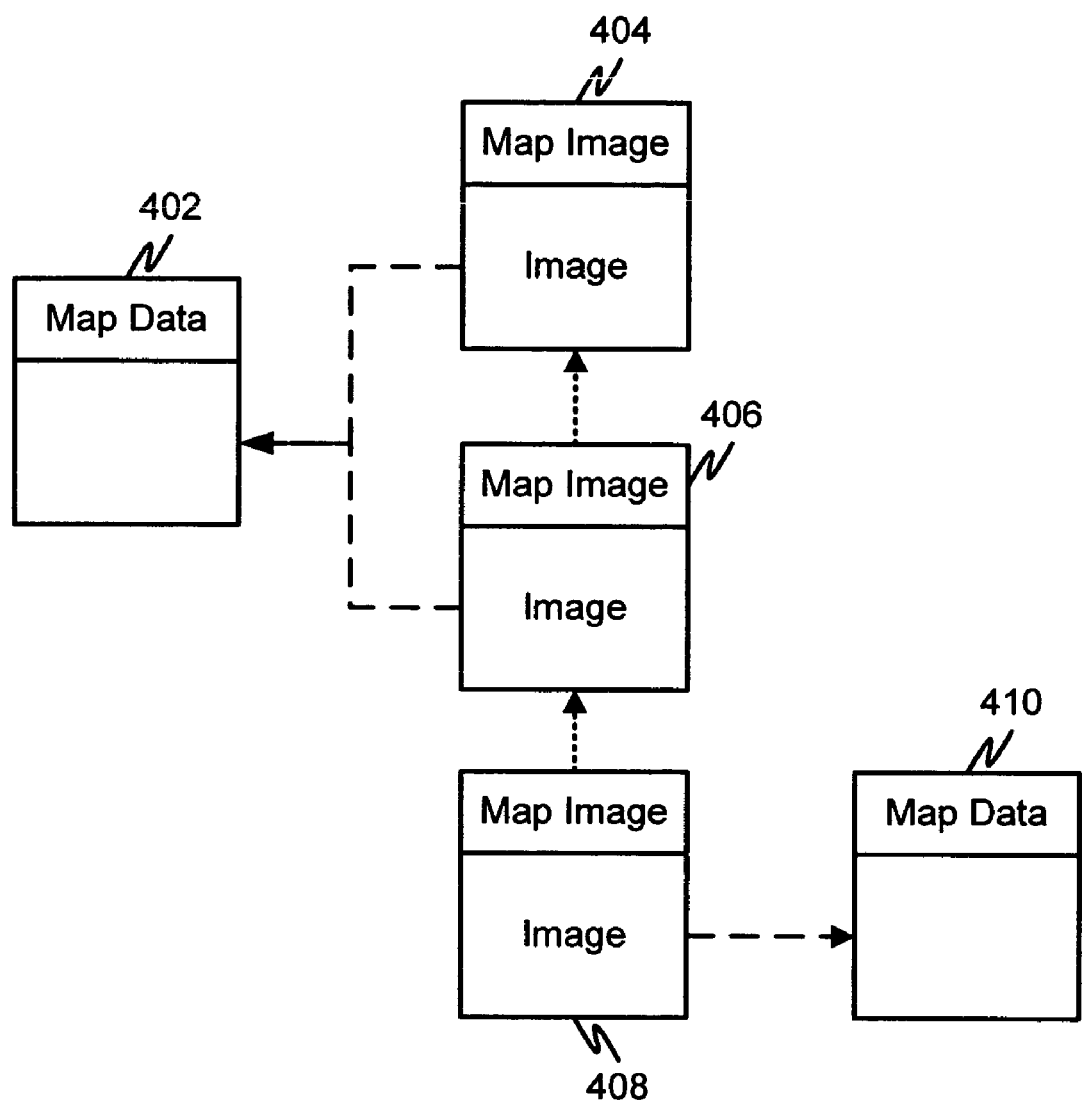
FIG. 4 is a block diagram of an exemplary embodiment of map object connectivity in accordance with the present invention.

FIG. 4 is a block diagram of an exemplary embodiment of map object connectivity in accordance with the present invention. In particular, a first map data object 402 is connected to a first map image object 404 and a second map image object 406. A second map data object 410 is connected to a third map image object 408. The third map image object 408 is connected to the second map image object 406. The second map image object 406 is connected to the first map image object 404.

In operation, the first map image object 404 and the second map image object 406 may be generating different images based on a common map data object 402. While the third map image object 410 may be generating an image based on the second map data object 410. The map image objects may project and fuse the map image into the map image memory of the map image object that the map image objects are connected to.

Figure 5:
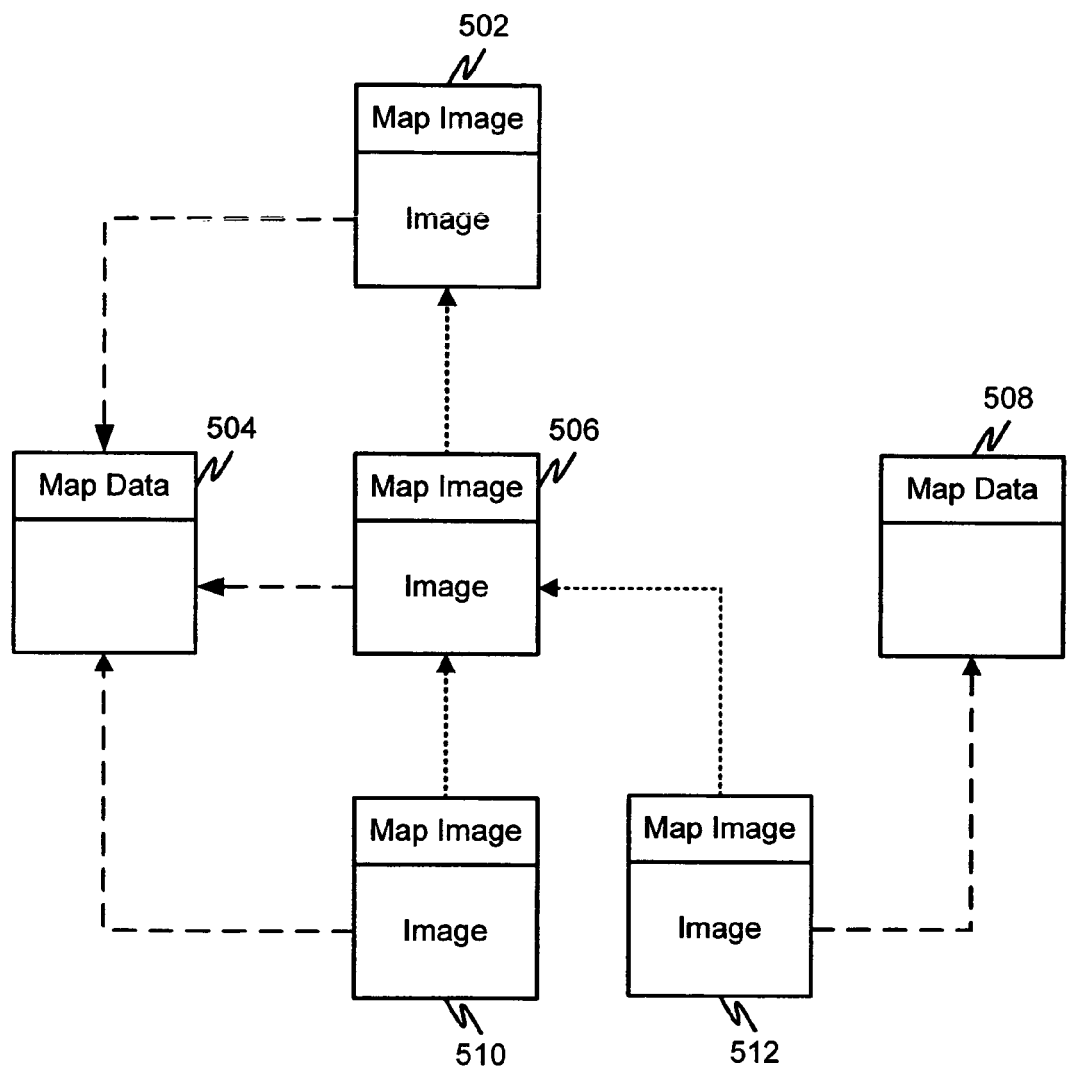
FIG. 5 is a block diagram of an exemplary embodiment of map object connectivity in accordance with the present invention.

FIG. 5 is a block diagram of an exemplary embodiment of map object connectivity in accordance with the present invention. In particular, a first map data object 504 is connected to a first map image object 502, a second map image object 506, and a third map image object 510. A second map data object 508 is connected to a fourth map image object 512. The third map image object 510 and the fourth map image object 512 are connected to the second map image object 506. The second map image object 506 is connected to the first map image object 502.

In operation, three map image objects (502, 506, and 510) may each generate the same or different images based on the first map data object 504. The fourth map image object 512 may be generating an image based on the second map data object 508. The third map image object 510 and fourth map image object 512 generate their respective map images and project and fuse them into the map image of the first image object 502 via the connection between the second map image object 506 and the first map image object 502. The second map image object 506 is connected to the first image object 502, and thus does not contain its own image and projection. The second map image object 506 projects and fuses its map image in the first map image object 502. In the exemplary embodiment of FIG. 5, all map image objects are ultimately connected to the first map image object 502.

Figure 6:
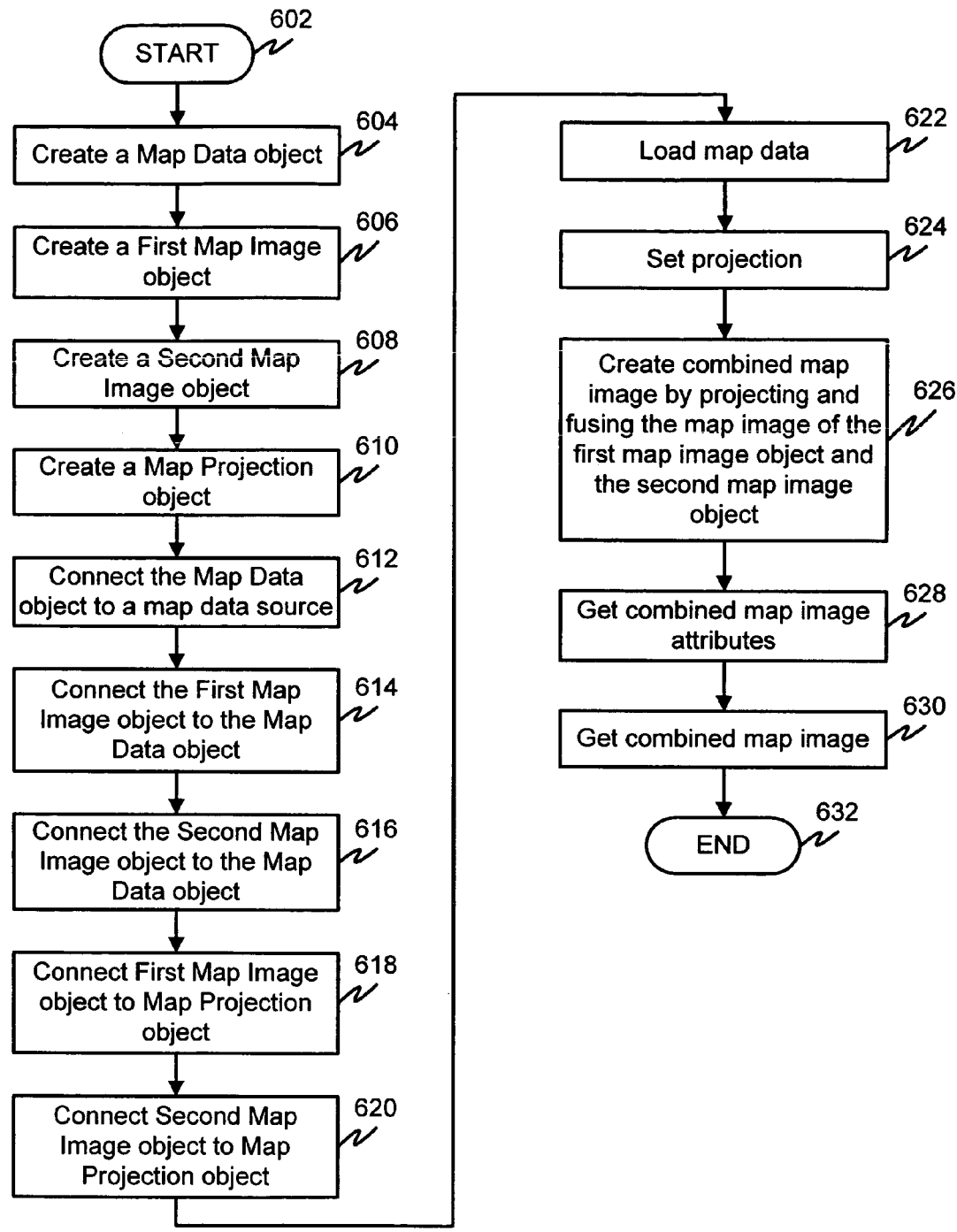
FIG. 6 is a flowchart of an exemplary embodiment of a map object connectivity method in accordance with the present invention.

FIG. 6 is a flowchart of an exemplary embodiment of a multiple map image projecting and fusing method in accordance with the present invention. In particular, control begins at step 602 and continues to step 604.

In step 604, a map data object is created. Control continues to step 606. In step 606 a first map image object is created. Control continues to step 608.

In step 608, a second map image object is created. Control continues to step 610. In step 610, a map projection object is created. Control continues to step 612.

In step 612, the map data object is connected to a map data source. The map data source may be a map database or another map data object previously created. Control continues to step 614.

In step 614, the first map image object is connected to the map data object. Control continues to step 616. In step 616, the second map image object is connected to the map data object. Control then continues to step 618.

In step 618, the first map image object is connected to the map projection object. Control continues to step 620. In step 620, the second map image object is connected to the map projection object. Control continues to step 622.

In step 622, map data is loaded from the map data source to the map data object. Control continues to step 624. In step 624, the map image objects set the projection of the map projection object. Control continues to step 626.

In step 626, a combined map image is created by projecting and then fusing the map images from the first map image object and the second map image object. Control continues to step 628.

In step 628, an application program gets the combined map image attributes. Control continues to step 630. In step 630, an application program gets the combined map image for display, printing, use in navigation, and/or the like. Control continues to step 632, where the control sequence ends.

Figure 7:
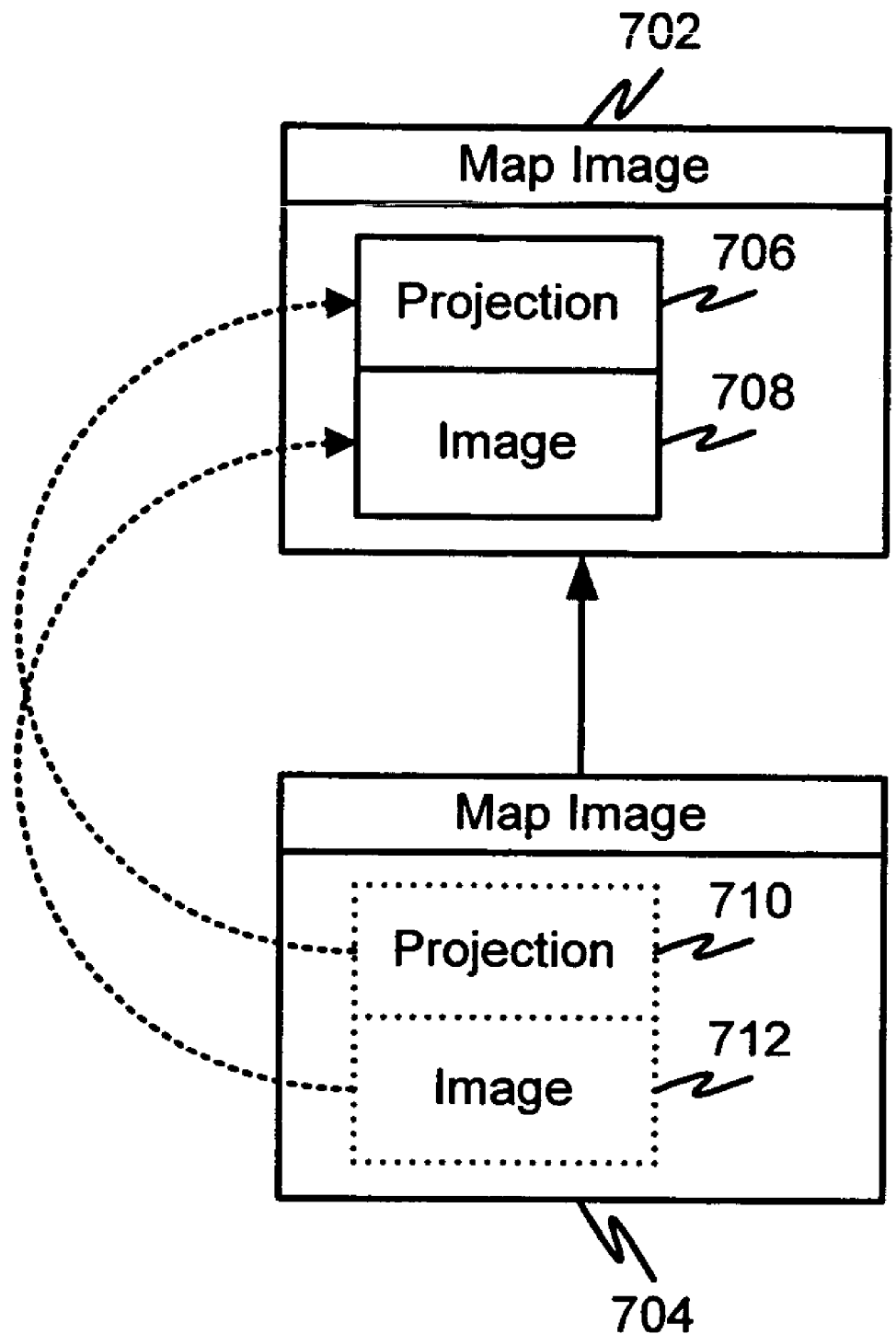
FIG. 7 is a diagram of an exemplary embodiment of multiple map projecting and fusing in accordance with the present invention.

FIG. 7 is a diagram of an exemplary embodiment of multiple map projecting and fusing in accordance with the present invention. In particular, a first map image object 702 comprises a map image 708 and a map projection object connection 706. A second map image object 704 comprises a map image connection 712 and a map projection object connection 710.

In operation, after the first map image object 702 is created. The first map image object 702 establishes a map projection object connection 706. The second map image object 704 is created. The map projection object connection 710 of the second map image object 704 is connected to the map projection object connection 706 of the first map image object 702. The map image connection 712 of the second map image object 704 is connected to the map image 708 of the first map image object 702. Once these connections have been established, the two map image objects (702 and 704) are capable of projecting and fusing multiple map images into a combined map image. In this case, the combined map image is contained within the map image 708 of the first map image object 702.

Figure 8:
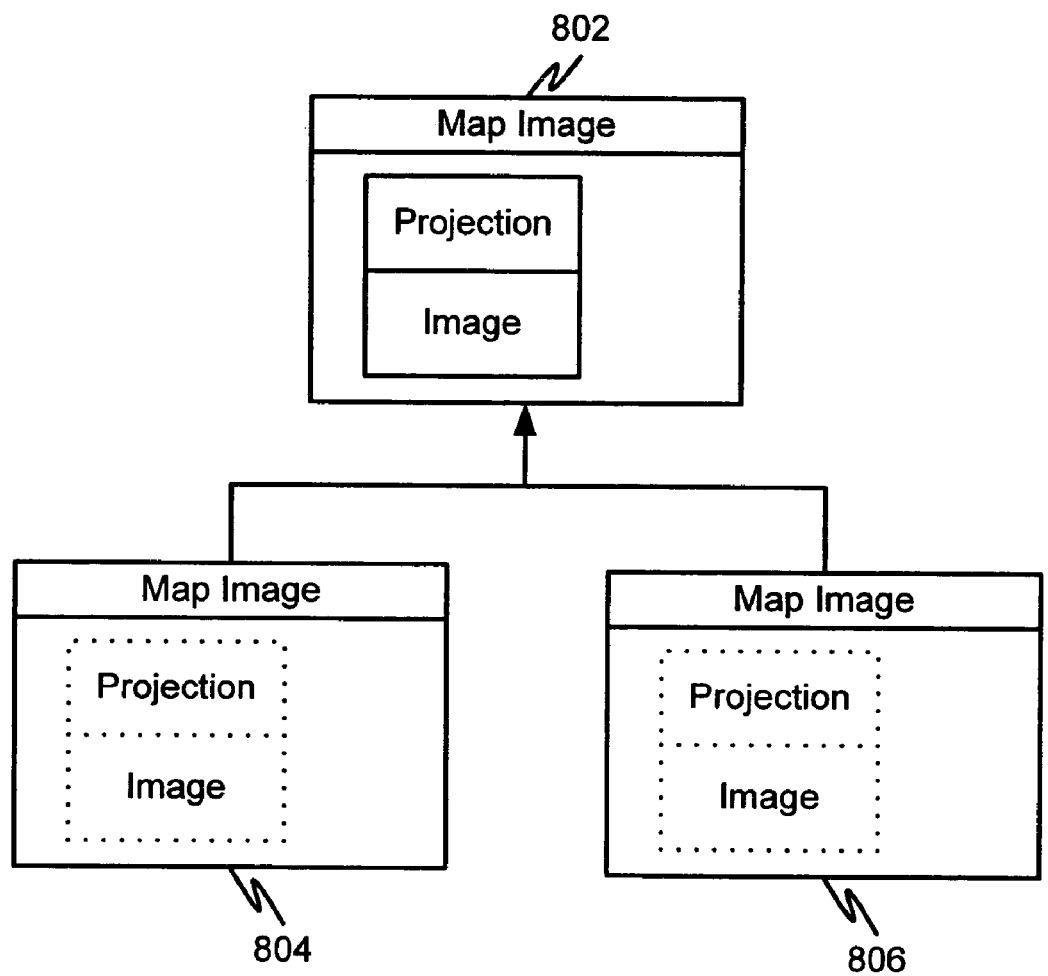
FIG. 8 is a diagram of an exemplary embodiment of multiple map projecting and fusing in accordance with the present invention.

FIG. 8 is a diagram of an exemplary embodiment of multiple map projecting and fusing in accordance with the present invention. In particular, a first map image object 802, a second map image object 804 and a third map image object 806 are shown. The second map image object 802 and third map image object 806 are connected to the first map image object 802.

In operation, a combined map image may be created by projecting the map images of the first map image object 802, the second map image object 804 and the third map image object 806 and fusing the resulting images into the map image of the first map image object 802. In the exemplary embodiment shown in FIG. 8, the map image objects are coupled via a parallel-like connection. It should also be appreciated that the rendering (projecting and fusing) order of the images is not fixed and may be varied according to a contemplated use of the embodiment. Further, it may be possible to render any of the three images individually, and the resulting single image will be contained in map image object 802. It is also possible to render any combination of the images in any order, thus creating varied layering effects.

Figure 9:
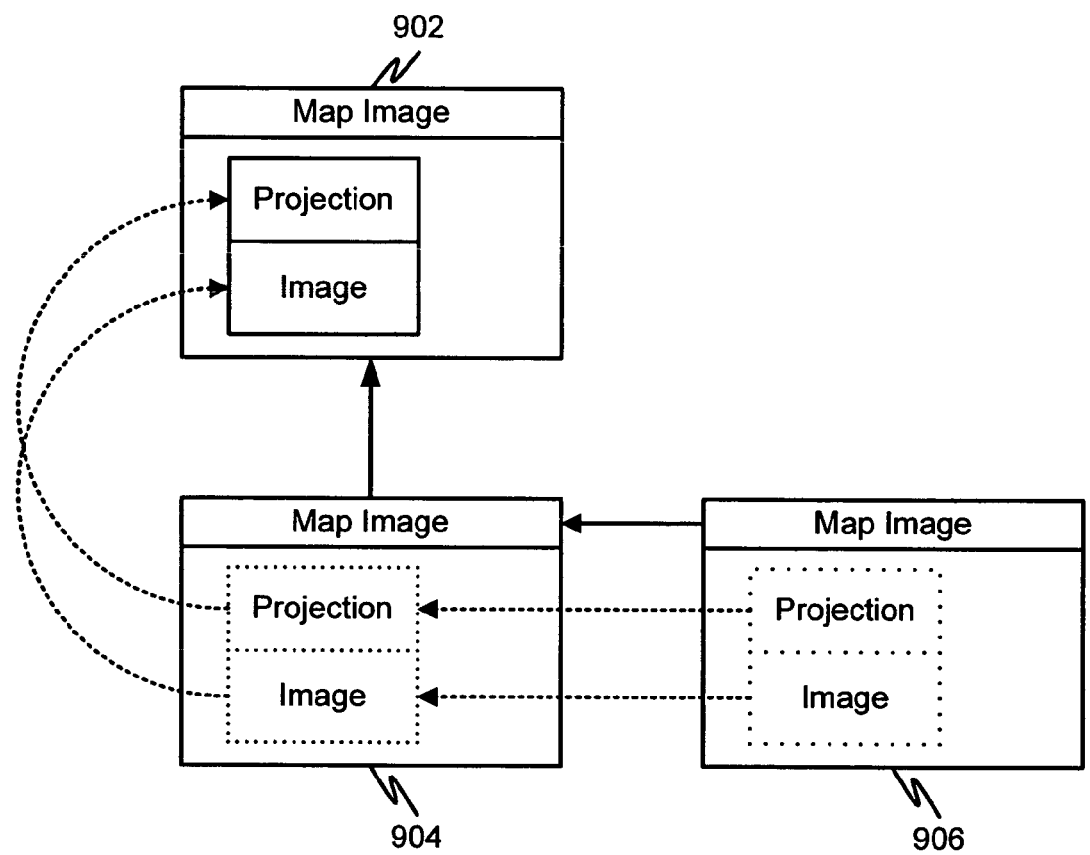
FIG. 9 is a diagram of an exemplary embodiment of multiple map projecting and fusing in accordance with the present invention.

FIG. 9 is a diagram of an exemplary embodiment of multiple map projecting and fusing in accordance with the present invention. In particular, a first map image object 902 is connected to a second map image object 904. The second map image object 904 is connected to a third map image object 906.

In operation, projecting and fusing the map image of the third map image object 906 and the map image of the second map image object 904 into the map image of the first map image object 902 forms a map image. Both the second map image object 904 and the third map image object 906 will fuse directly into map image object 902 creating a final combined map image. In the exemplary embodiment shown in FIG. 9, the map image objects are coupled via a serial-like connection. It should also be appreciated that the rendering (projecting and fusing) order of the images is not fixed and may be varied according to a contemplated use of the embodiment. Further, it may be possible to render any of the three images individually, and the resulting single image will be contained in map image object 902. It is also possible to render any combination of the images in any order, thus creating varied layering effects.

Figure 10:
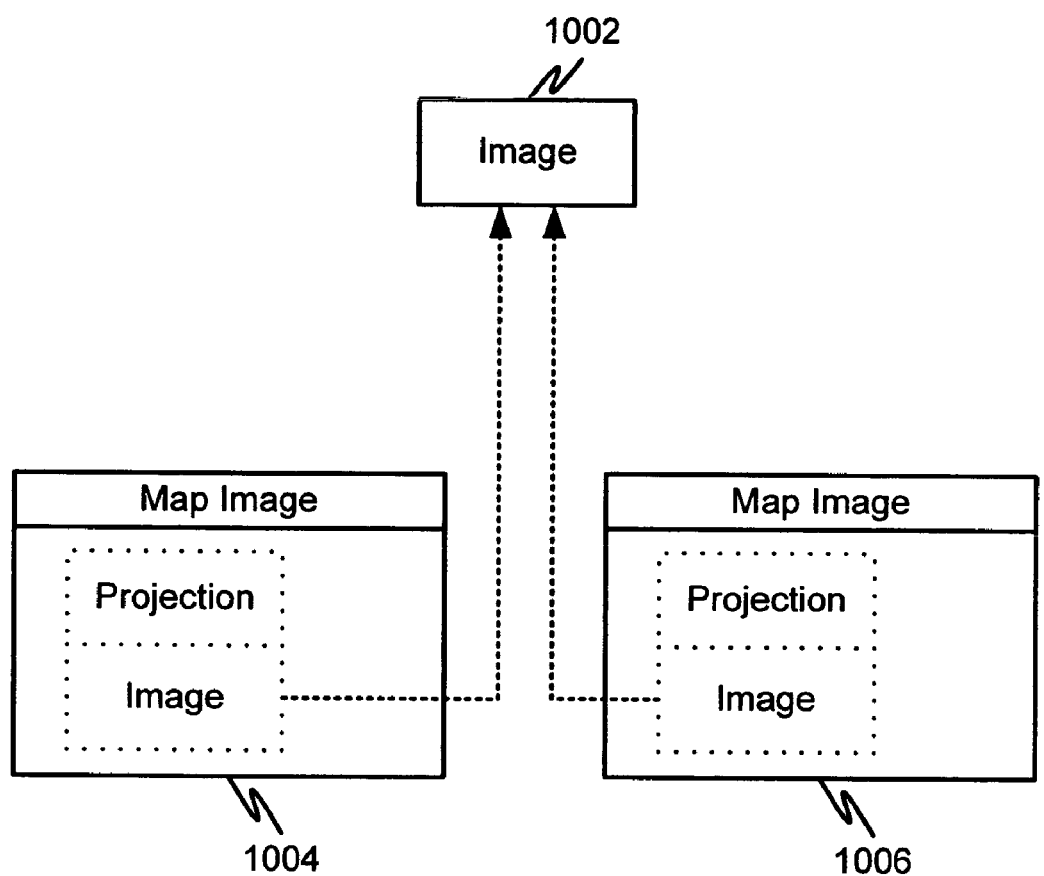
FIG. 10 is a diagram of an exemplary embodiment of multiple map projecting and fusing in accordance with the present invention.

FIG. 10 is a diagram of an exemplary embodiment of multiple map projecting and fusing in accordance with the present invention. In particular, a map image 1002 is not part of a map image object. A first map image object 1004 and a second map image object 1006 are connected to the map image 1002.

In operation, the first map image object 1004 and the second map image object 1004 project and fuse their respective images into the map image 1002 to create a combine map image residing in the memory space of the map image 1002.

Figure 11:
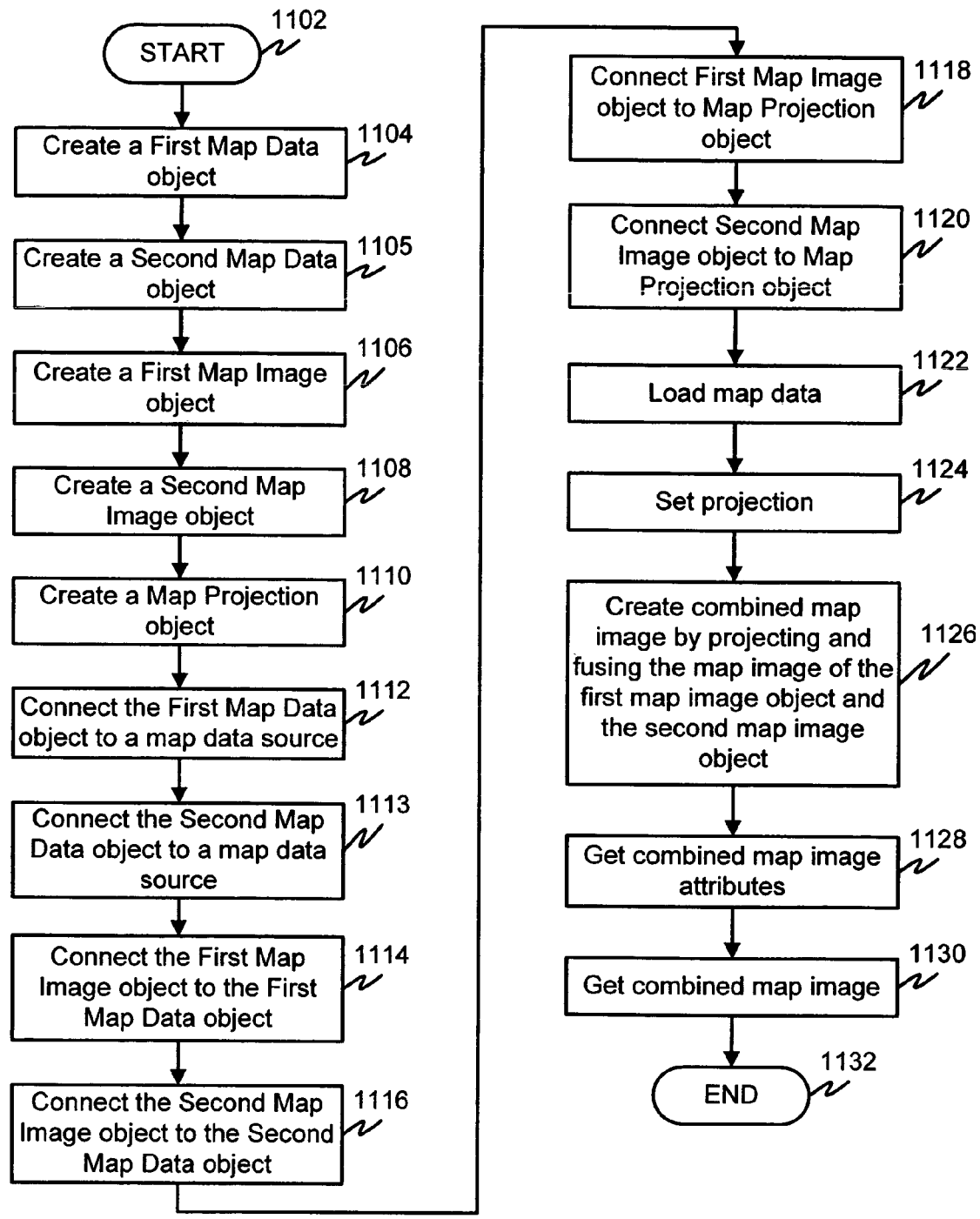
FIG. 11 is a flowchart of an exemplary embodiment of a method of multiple map image projecting and fusing in accordance with the present invention.

FIG. 11 is a flowchart of an exemplary embodiment of a method of multiple map image projecting and fusing in accordance with the present invention. In particular, control begins at step 1102 and continues to step 1104.

In step 1104, a first map data object is created. Control continues to step 1105, where a second map data object is created. Control continues to step 1106. In step 1106, a first map image object is created. Control continues to step 1108.

In step 1108, a second map image object is created. Control continues to step 1110. In step 1110, a map projection object is created. Control continues to step 1112.

In step 1112, the first map data object is connected to a map data source. The map data source may be a map database or another map data object previously created. Control continues to step 1113.

In step 1113, the second map data object is connected to a map data source. The map data source may be a map database or another map data object previously created. The map data source connected to the second map data object may be the same as, or different from, the map data source connected to the first map data object. Control continues to step 1114.

In step 1114, the first map image object is connected to the first map data object. Control continues to step 1116. In step 1116, the second map image object is connected to the second map data object. Control then continues to step 1118.

In step 1118, the first map image object is connected to the map projection object. Control continues to step 1120. In step 1120, the second map image object is connected to the map projection object. Control continues to step 1122.

In step 1122, map data is loaded from the map data sources to the map data objects. Control continues to step 1124. In step 1124, the map image objects set the projection of the map projection object. Control continues to step 1126.

In step 1126, a combined map image is created by projecting and then fusing the map images from the first map image object and the second map image object. Control continues to step 1128.

In step 1128, an application program gets the combined map image attributes. Control continues to step 1130. In step 1130, an application program gets the combined map image for display, printing, use in navigation, and/or the like. Control continues to step 1132, where the control sequence ends.

The methods and systems for multiple map image projecting and fusing, as shown in the above figures, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement methods and systems for multiple map image projecting and fusing according to this invention.

Furthermore, the disclosed system may be readily implemented in software using object or object-oriented software development environments that provide portable source code that can be used on a variety of computer platforms. Alternatively, the disclosed methods and systems for multiple map image projecting and fusing may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The methods and systems for multiple map image projecting and fusing illustrated herein can readily be implemented in hardware and/or software using any known or later developed systems or structures, devices and/or software by those of ordinary skill in the applicable art from the functional description provided herein and with a general basic knowledge of the computer and graphics arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of a navigation processor, vehicle control processor, or image processor.

It is, therefore, apparent that there is provided in accordance with the present invention, methods and systems for multiple map image projecting and fusing. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method for projecting and fusing multiple map images in an object oriented computer system on an aircraft, said method comprising the steps of:

creating a first map data object, wherein the first map data object comprises a map data connection process and a map data retrieval process;

creating a second map data object, wherein the second map data object comprises a map data connection process and a map data retrieval process;

creating a first map image object, wherein the first map image object comprises a map data selection process and a map image rendering process;

creating a second map image object, wherein the second map image object comprises a map data selection process and a map image rendering process;

creating a map projection object, wherein the map projection object comprises a map projection process;

connecting the first map data object to a first map data source by invoking the map data connection process of the first map data object and providing a first map data source identifier;

connecting the second map data object to a second map data source by invoking the map data connection process of the second map data object and providing a second map data source identifier;

connecting the first map image object to the first map data object by invoking the map data selection process of the first map image object and providing an identifier corresponding to the first map data object, and connecting the first map image object to the map projection object;

connecting the second map image object to the second map data object by invoking the map data selection process of the second map image object and providing an identifier corresponding to the second map data object, and connecting the second map image object to the map projection object;

connecting a map image of the second map image object to a map image of the first map image object; and creating a combined map image on an aircraft from the first map image object and the second map image object by invoking the map rendering process of each map image object and projecting a map image from each of the first map image object and the second map image object by invoking the map projection process of the map projection object by fusing the images together into the combined map image.

2. The method of claim 1, wherein the step of creating a combined map image by invoking the map image rendering method of the map image objects further comprises retrieving map data from the map data source by invoking the map data retrieval process of the map data object.

3. The method of claim 1, wherein the combined map image is projected and stored in a map image associated with the first map image object.

4. The method of claim 1, wherein the combined map image is projected and stored in a map image not associated with the first map image object.

5. The method of claim 1, wherein the first map data source is one of a map database or a map data object.

6. The method of claim 1, wherein the second map data source is one of a map database or a map data object.

7. The method of claim 1, wherein the first map data source identifier and the second map data source identifier are the same.

8. The method of claim 1, wherein the first map data source identifier and the second map data source identifier are different.

9. A computer readable medium having software instructions encoded thereon for enabling a computer to provide map image object connectivity in an object oriented environments, the software instructions, when executed, cause the computer to perform a series of predetermined operations, including the steps of:

creating a first map data object, wherein the first map data object comprises a map data connection process and a map data retrieval process;

creating a second map data object, wherein the second map data object comprises a map data connection process and a map data retrieval process;

creating a first map image object, wherein the first map image object comprises a map data selection process and a map image rendering process;

creating a second map image object, wherein the second map image object comprises a map data selection process and a map image rendering process;

creating a map projection object, wherein the map projection object comprises a map projection process;

connecting the first map data object to a first map data source by invoking the map data connection process of the first map data object and providing a first map data source identifier;

connecting the second map data object to a second map data source by invoking the map data connection process of the second map data object and providing a second map data source identifier;

connecting the first map image object to the first map data object by invoking the map data selection process of the first map image object and providing an identifier corresponding to the first map data object, and connecting the first map image object to the map projection object;

connecting the second map image object to the second map data object by invoking the map data selection process of the second map image object and providing an identifier corresponding to the second map data object, and connecting the second map image object to the map projection object;

connecting a map image of the second map image object to a map image of the first map image object; and creating a combined map image from the first map image object and the second map image object by invoking the map rendering process of each map image object and projecting a map image from each of the first map image object and the second map image object by invoking the map projection process of the map projection object by fusing the images together into the combined map image.

10. The computer readable medium of claim 9, wherein the combined map image is projected and stored in a map image associated with the first map image object.

11. The computer readable medium of claim 9, wherein the combined map image is projected and stored in a map image not associated with the first map image object.

12. The computer readable medium of claim 9, wherein the first map data source is one of a map database or a map data object.

13. The computer readable medium of claim 9, wherein the second map data source is one of a map database or a map data object.

14. The computer readable medium of claim 9, wherein the first map data source identifier and the second map data source identifier are the same.

15. The computer readable medium of claim 9, wherein the first map data source identifier and the second map data source identifier are different.

16. The computer readable medium of claim 9, wherein the software instructions are configured to operate on a computer on an aircraft.

17. A computer system adapted to projecting and fusing multiple map images comprising:
    a processor, and
    a memory including software instructions configured to cause the computer system to perform the steps of:
        creating a first map data object, wherein the first map data object comprises a map data connection process and a map data retrieval process;
        creating a second map data object, wherein the second map data object comprises a map data connection process and a map data retrieval process;
        creating a first map image object, wherein the first map image object comprises a map data selection process and a map image rendering process;
        creating a second map image object, wherein the second map image object comprises a map data selection process and a map image rendering process;
        creating a map projection object, wherein the map projection object comprises a map projection process;
        connecting the first map data object to a first map data source by invoking the map data connection process of the first map data object and providing a first map data source identifier;
        connecting the second map data object to a second map data source by invoking the map data connection process of the second map data object and providing a second map data source identifier;
        connecting the first map image object to the first map data object by invoking the map data selection process of the first map image object and providing an identifier corresponding to the first map data object, and connecting the first map image object to the map projection object;
        connecting the second map image object to the second map data object by invoking the map data selection process of the second map image object and providing an identifier corresponding to the second map data object, and connecting the second map image object to the map projection object;
        connecting a map image of the second map image object to a map image of the first map image object; and
        creating a combined map image from the first map image object and the second map image object by invoking the map rendering process of each map image object and projecting a map image from each of the first map image object and the second map image object by invoking the map projection process of the map projection object by fusing the images together into the combined map image.

18. The computer system of claim 17, wherein the combined map image is projected and stored in a map image associated with the first map image object.

19. The computer system of claim 17, wherein the combined map image is projected and stored in a map image not associated with the first map image object.

20. The computer system of claim 17, wherein the first map data source is one of a map database or a map data object.

21. The computer system of claim 17, wherein the second map data source is one of a map database or a map data object.

22. The computer system of claim 17, wherein the first map data source identifier and the second map data source identifier are the same.

23. The computer system of claim 17, wherein the first map data source identifier and the second map data source identifier are different.

24. The computer system of claim 17, wherein the processor is onboard an aircraft.

* * * * *

UNITED STATES PATENT AND TRADEMARK OFFICE
CERTIFICATE OF CORRECTION

PATENT NO. : 7,492,965 B2 Page 1 of 1
APPLICATION NO. : 11/014705
DATED : February 17, 2009
INVENTOR(S) : Marc Blais It is certified that error appears in the above-identified patent and that said Letters Patent is hereby corrected as shown below:

Column 12 – Line 28, replace "environments" with -- environment --.

Signed and Sealed this

Fifth Day of January, 2010

David J. Kappos
*Director of the United States Patent and Trademark Office*